(12) United States Patent
Feng et al.

(10) Patent No.: US 7,666,508 B2
(45) Date of Patent: Feb. 23, 2010

(54) GLASS ARTICLE HAVING A LASER MELTED SURFACE

(75) Inventors: Jiangwei Feng, Painted Post, NY (US); Stephan Lvovich Logunov, Corning, NY (US); Robert Sabia, Corning, NY (US)

(73) Assignee: Corning Incorporated, Corning, NY (US)

( * ) Notice: Subject to any disclaimer, the term of this patent is extended or adjusted under 35 U.S.C. 154(b) by 279 days.

(21) Appl. No.: 11/805,159

(22) Filed: May 22, 2007

(65) Prior Publication Data

US 2008/0292845 A1 Nov. 27, 2008

(51) Int. Cl.
*B32B 17/00* (2006.01)
*C03C 19/00* (2006.01)

(52) U.S. Cl. .............. 428/409; 428/410; 65/61
(58) Field of Classification Search .............. None
See application file for complete search history.

(56) References Cited

U.S. PATENT DOCUMENTS

| | | | | |
|---|---|---|---|---|
| 5,773,126 | A * | 6/1998 | Noritake et al. | 428/143 |
| 6,744,458 | B2 | 6/2004 | Yamada et al. | 347/224 |
| 2002/0052122 | A1 * | 5/2002 | Tanaka et al. | 438/758 |
| 2004/0067338 | A1 * | 4/2004 | Kaminsky et al. | 428/141 |
| 2005/0013972 | A1 * | 1/2005 | Kusabiraki et al. | 428/141 |
| 2005/0039788 | A1 * | 2/2005 | Blieske et al. | 136/246 |

FOREIGN PATENT DOCUMENTS

EP 1498775 1/2005

* cited by examiner

*Primary Examiner*—Gwendolyn Blackwell
(74) *Attorney, Agent, or Firm*—Robert P. Santandrea

(57) ABSTRACT

A glass article having at least one edge of which at least a portion has been laser melted. The laser melted portion scatters light, thus enabling the glass article to be properly aligned. In some embodiments, the laser melted portion also provides a roughened edge having a coefficient of friction that facilitates handling of the glass article. The laser melted portion is formed by irradiating the peripheral surface with a laser beam to cause localized melting.

43 Claims, 5 Drawing Sheets

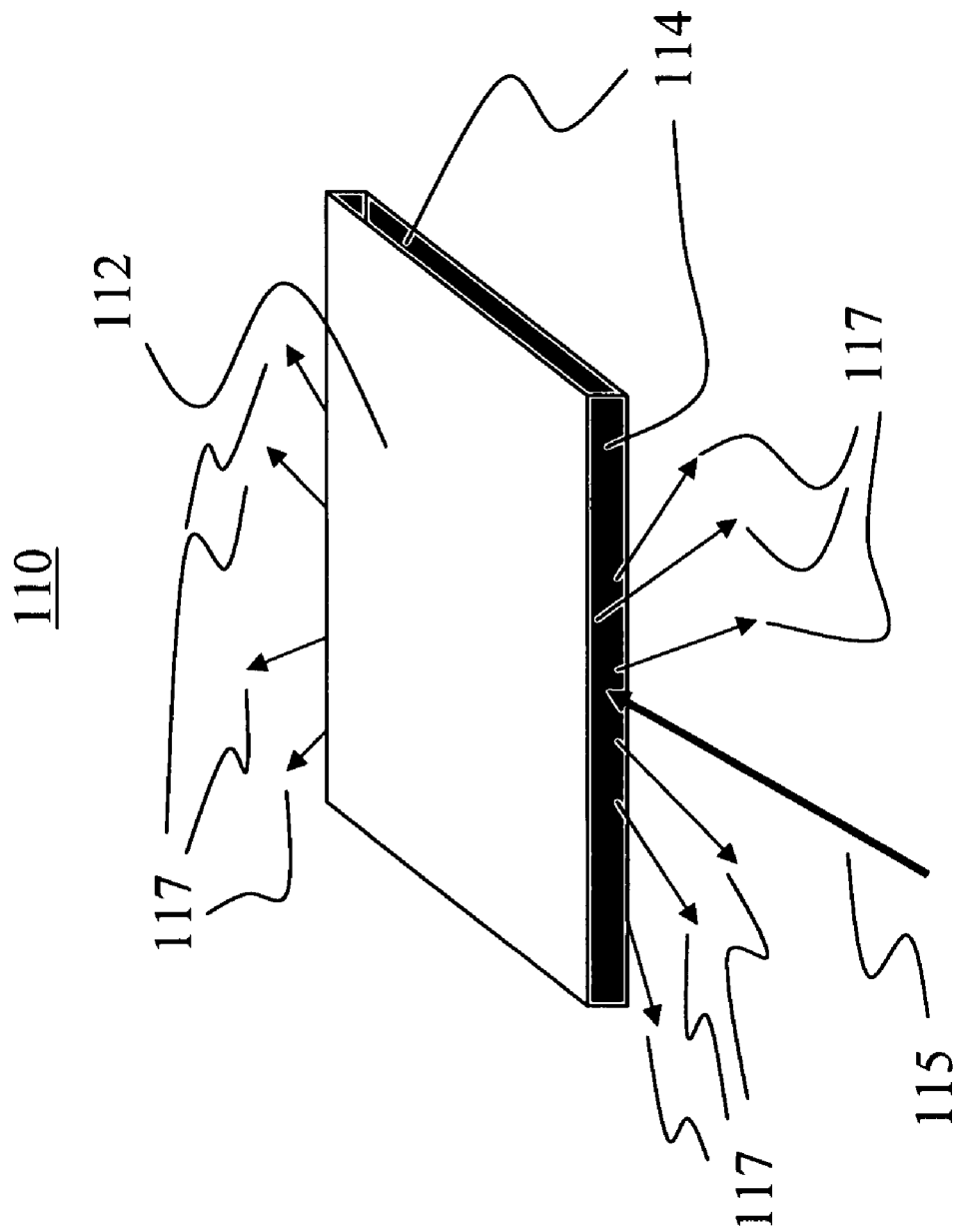

GLASS ARTICLE HAVING A LASER MELTED SURFACE

BACKGROUND OF INVENTION

The invention relates to glass articles having a roughened surface. More particularly, the invention relates to glass articles having a roughened peripheral surface or edge that is capable of scattering incident light. Even more particularly, the invention relates to a glass article having such an edge that has been roughened by laser melting.

Glass articles, such as liquid crystal display image masks, require relatively smooth, polished planar surfaces that are free of physical defects or contamination. A rogue contaminant particle, if pulled across the polished planar surface may, for example, mechanically abrade the surface, producing a physical dig or subsurface damage. Particle contamination may be generated by the release of trapped debris (e.g., glass chips, lapping and/or polishing compounds) originating from the ground edge of the glass article during handling or from ultrasonic cleaning. The released debris may work itself onto the polished surface of the article. Another source of contamination is crack propagation originating from subsurface damage. Such crack propagation releases glass chips from the ground edge.

Glass articles such as image masks are often provided with ground or otherwise roughened edges. Because of their light scattering properties, such roughened edges assist in alignment of the glass article. In addition, roughened edges facilitate manual handling of the glass article. However, ground edges also act as a major source of debris that may damage the polished surfaces of the article.

Thus, while providing a glass article with roughened edges is highly desirable, it also is a major source of contamination. Therefore, what is needed is a glass article having an edge that is capable of scattering light and/or facilitating handling. What is also needed is a glass article having an edge that has a low level of release of debris. What is also needed is a method of making such an edge.

SUMMARY OF INVENTION

The present invention meets these and other needs by providing a glass article having at least one edge (also referred to hereinafter as a "peripheral surface"), a portion of which is laser melted. The laser melted portion scatters light, thus enabling the glass article to be properly aligned. In some embodiments, the laser melted portion also provides a roughened edge having a coefficient of friction that facilitates handling of the glass article. The laser melted portion is formed by irradiating the peripheral surface glass article to cause localized melting.

Accordingly, one aspect of the invention is to provide a glass article. The glass article has a surface comprising a laser melted portion, wherein the laser melted portion has a RMS roughness that is capable of scattering light of a predetermined wavelength and a particle release of less than about 650 particles/cm² area of the surface, wherein each of the particles released is greater than 2 µm in size.

A second aspect of the invention is to provide a fused silica article. The fused silica glass article has a roughened peripheral surface that is capable of scattering light of a predetermined wavelength. The roughened peripheral surface comprises a laser melted portion, wherein the roughened peripheral surface has a particle release of less than about 650 particles/cm² area of the peripheral surface, wherein each of the particles released is greater than 2 µm in size.

A third aspect of the invention is to provide a fused silica article. The fused silica article has a roughened peripheral surface that is capable of scattering light of a predetermined wavelength. The roughened peripheral surface comprises a laser melted portion, wherein the roughened peripheral surface has a particle release of less than about 650 particles/cm² area of the peripheral surface, wherein each of the particles released is greater than 2 µm in size, and wherein the roughened peripheral surface has a static coefficient of friction in a range from about 0.30 to about 0.60, as measured using a Teflon rod in dry conditions.

A fourth aspect of the invention is to provide a method of making a glass article having a roughened peripheral surface. The method comprises the steps of: providing a laser having a predetermined wavelength; providing a glass article having a peripheral surface, wherein the glass article absorbs radiation at the predetermined wavelength; and irradiating at least a portion of the peripheral surface with the laser to form the roughened peripheral surface.

A fifth aspect of the invention is to provide a fused silica article having a roughened peripheral surface that is capable of scattering light of a predetermined wavelength, wherein the roughened peripheral surface is formed by: providing a laser having a predetermined wavelength; providing the fused silica article having a peripheral surface, wherein the fused silica article absorbs radiation at the predetermined wavelength; and irradiating the peripheral surface with the laser to form the roughened peripheral surface.

These and other aspects, advantages, and salient features of the present invention will become apparent from the following detailed description, the accompanying drawings, and the appended claims.

BRIEF DESCRIPTION OF THE DRAWINGS

FIG. 1 is a schematic representation of a planar glass article;

DETAILED DESCRIPTION

Figure 2A:
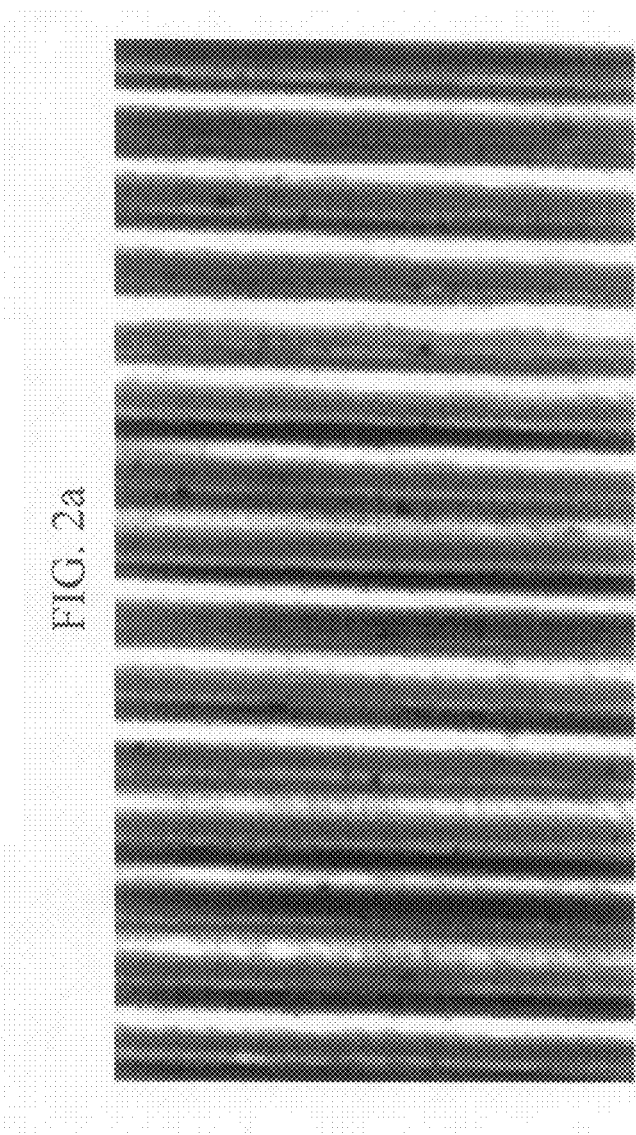
FIG. 2a is an optical image of a vertically oriented array of laser melted areas on a peripheral surface of fused silica.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as either comprising at least one of a group of elements and combinations thereof, it is understood that the group may comprise any number of those elements recited, either individually or in combination with each other. Similarly, whenever a group is described as consisting of at least one of a group of elements and combinations thereof, it is understood that the group may consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto.

A glass article having a surface comprising a laser melted portion is provided. The laser melted portion has a RMS roughness that is capable of scattering light of a predetermined wavelength. The glass article also exhibits a particle release of less than about 650 particles/cm² area of the surface. As used herein, the term "particle release" means the total number of particles having a size greater than 2 μm released per unit area of the surface (also referred to herein as the "edge" of the glass article) into deionized water after agitation at 120 kHz with 370-400 W power for 4 minutes at room temperature. In some embodiments, the surface from which particle release is measured is the peripheral surface (also referred to herein as the "edge" of the glass article) of the glass article.

Turning to FIG. 1, a planar glass article 110 is shown. The planar glass article 110, which is representative of a LCD image mask (also referred to herein as a "LCDIM"), has two major planar surfaces 112 and four peripheral surfaces 114—also referred to as herein as "edges." The terms "peripheral surface" and "edge" are used interchangeably herein and are understood to be equivalent terms. The glass article, however, need not be a LCDIM. The glass article may also be, for example, a cylindrical glass article (not shown), which may be an optical element, such as a lens, in a lithographic stepper/scanner system. Such a cylinder has two faces and a single peripheral surface. For the purposes of describing the invention, planar glass article 110 will be described and referred to unless otherwise stated.

In one embodiment, peripheral surfaces 114 comprise the laser melted portion mentioned above. While the following description describes the roughening of at least one peripheral edge, it is understood that the roughened surface need not be a peripheral surface of the glass article. Instead, it will be readily apparent to one skilled in the art that other surfaces of the glass article may be roughened by the techniques described herein.

Optical elements, such as lenses and LCDIMs, must be aligned precisely within an apparatus, such as a lithographic scanner/stepper system. Alignment is typically accomplished by irradiating a roughened peripheral surface or edge 114 of the glass article 110 with a laser beam 115 having a selected or predetermined wavelength and using light scattered 117 from the laser beam 115 back from or through peripheral surface 114 to align the glass article 110. The predetermined wavelength is typically in a range from about 500 nm to about 670 nm, with wavelengths of 532 nm and 633 nm being widely used. To facilitate detection of the scattered light (and alignment of the optical element), it is particularly advantageous to roughen at least a portion of peripheral surfaces 114.

To date, roughening of peripheral surfaces 114 has been typically achieved by grinding the peripheral surfaces 114. Such grinding typically takes place during the forming of the glass article when a near net shape is ground to meet the dimensional requirements of the glass article. Grinding particles, glass chips, and other contaminants released by the grinding process tend to migrate to major planar faces 112 of the glass article 110, causing scratches thereon. Debris generated by grinding also leads to crack propagation during subsequent processing and handling of glass article 110.

In the present invention, at least a portion of the peripheral surfaces 114 is roughened by localized melting of the peripheral surfaces 114. The localized melting is caused by irradiation of at least a portion of peripheral surfaces 114 by a laser. The localized melting of the peripheral surfaces 114 creates additional roughness and opaqueness. The resulting RMS roughness is capable of scattering light of the predetermined wavelength at a predetermined scattering angle. In one embodiment, the predetermined wavelength is in a range from about 500 nm to about 670 nm, with radiation having a wavelength of either 532 nm or 633 nm commonly being used. The scattered light has a normalized intensity ranging from about 100 to about 50, with absolute total scattering in a range from about 1% up to about 20%, for scattering angles ranging from about 5° to about 60° to the incident light.

The laser is selected such that glass article 110 strongly absorbs at the wavelength of the irradiating laser. Peripheral surfaces 114 of glass articles 110 formed from fused silica glass, for example, are irradiated with a $CO_2$ laser. However, any other suitable laser such, for example, an excimer laser having a wavelength of 193 nm, may be used to irradiate the fused silica glass article 110. In one particular embodiment, the $CO_2$ laser is a continuous power rather than a pulsed laser. The laser may, however, be pulsed at a frequency of at least 500 Hz, so as to be quasi-continuous. The $CO_2$ laser causes in situ localized melting of the fused silica peripheral surface, but does not cause subsurface damage that typically leads to debris generation. Depending on the power regime used to irradiate the peripheral surface, the localized melting of the fused silica peripheral surface 114 creates either a depression or raised surface on the irradiated area. Due to the low coefficient of thermal expansion (CTE) of fused silica ($5.5 \times 10^{-7}$ cm/(cm·K)), the residual stress resulting from the laser melting procedure is minimal. Glasses, such as soda-lime glass, having higher coefficients of thermal expansion may be laser treated as well. In these instances, the glass is preheated to at least 100° C., laser treated, and cooled slowly to minimize stress effects.

In one embodiment, the $CO_2$ laser beam is rastered across the peripheral surface 114, causing in situ localized melting of a portion of the peripheral surface. Surface tension and localized cooling effects combine to produce a warped surface which, upon cooling, is rough and opaque. In one embodiment, this warped surface has a RMS roughness of up to about 15,000 nm. In another embodiment, the RMS roughness is in a range from about 100 nm to about 15,000 nm. In yet another embodiment, the RMS roughness the RMS roughness is in a range from about 100 nm up to about 13,000 nm. Rastering the $CO_2$ laser beam across the peripheral surface 114 does not generate particles or subsurface damage that can create particles during subsequent processing of handling.

Figure 2B:
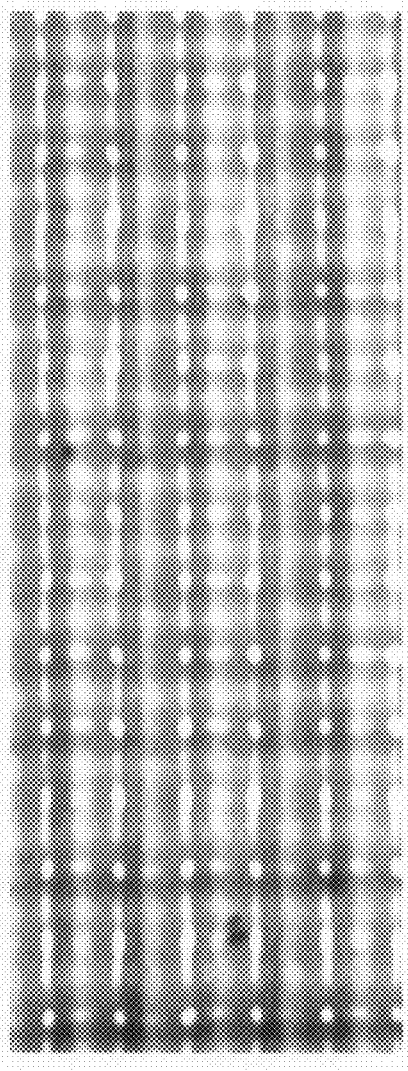
FIG. 2b is an optical image of a combined array of vertically and horizontally oriented laser melted areas on a peripheral surface of fused silica.

Rastering the $CO_2$ laser beam across the peripheral surface may be used to form a laser melted portion of the peripheral surface that is patterned. The pattern may be either periodic or aperiodic. Alternatively, the laser melted regions may be disposed on the peripheral surface in a random fashion. Non-limiting examples of such patterns are shown in FIGS. 2a and 2b, which are optical micrographs (100× magnification) of laser melted portions of peripheral surfaces of fused silica. The patterns of laser melted areas will affect the distribution of scattered light. Generally, light is scattered in a direction perpendicular to a line of laser melted material. For example, a pattern of vertically oriented laser melted areas (FIG. 2a) provides light scattering primarily in the horizontal direction. The pattern shown in FIG. 2b comprises both horizontal and vertical lines of laser melted material, and thus provides light scattering in both vertical and horizontal directions.

The parameters of the pattern written by the laser may be varied by changing the direction, period, and width of the laser melted areas, as seen in FIGS. 2a and 2b. The dimensions of the laser melted areas may be varied by altering beam diameter, power density, and beam scanning speed.

In one embodiment, the $CO_2$ laser operates in a continuous power mode, with power varying from 2 to 30 W. The beam is focused by a singlet lens with the focus spot at the peripheral surface—or edge—of the LCDIM. The beam diameter may be changed by adjusting the focus position. The minimum spot size of the beam may be 20 μm. The LCDIM is translated by an X-Y stage at speeds of up to 100 mm/s. Alternatively, the LCDIM may be held in a fixed position and the laser beam may be translated using either an X-Y stage or a scanning mirror. Since the area to be roughened is not significant, the entire procedure may take from 5 to 10 minutes. The treatment time may be significantly reduced if only a portion of the peripheral surface is to be roughened.

The release of particles from the peripheral surface when subjected to a predetermined frequency of ultrasonic energy, also referred to as "edge particle shedding," serves an indicator of the extent of subsurface damage suffered by the peripheral surface during the roughening process. Particle release is determined by agitating the glass article at 120 kHz at a power of 370 W to 400 W in deionized water for 4 minutes at room temperature. The release of particles larger than 2 μm from the peripheral surface of the glass article is less than about 650 particles/$cm^2$ area of the peripheral surface. In one embodiment, release of particles larger than 2 μm from the peripheral surface of the glass article is less than about 80 particles/$cm^2$ under these conditions.

Figure 3:
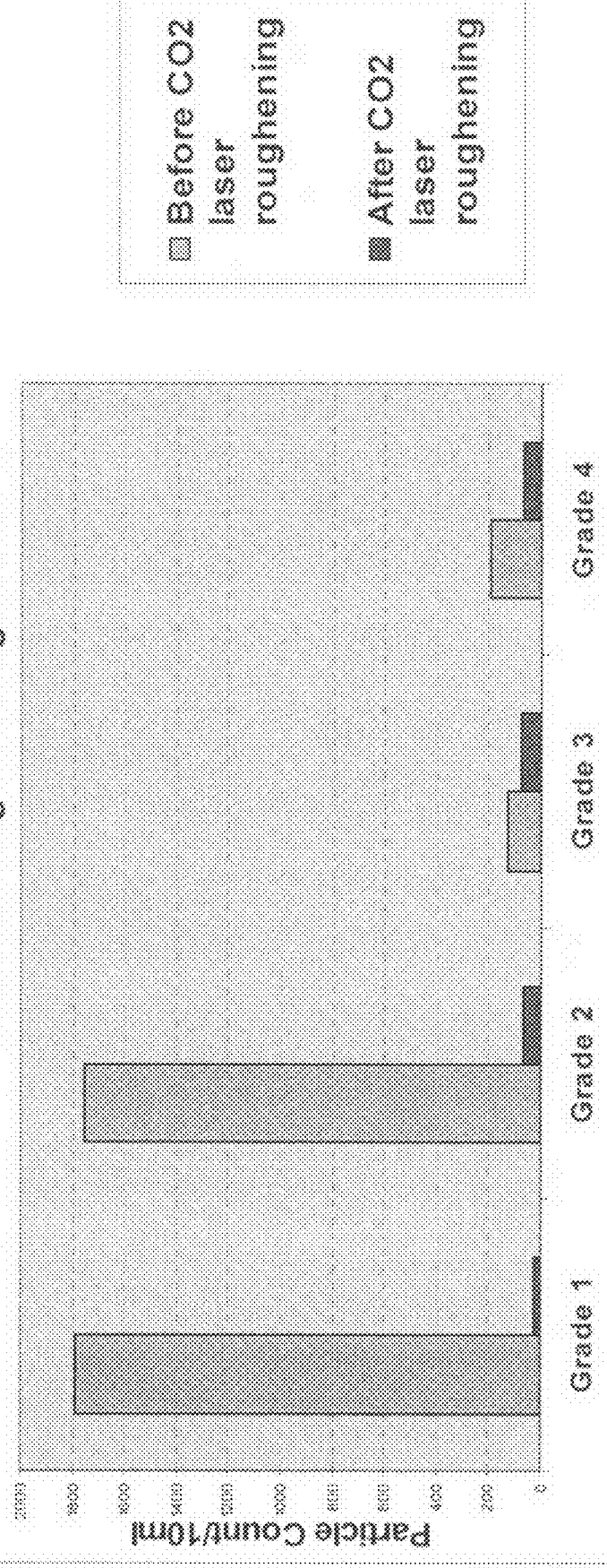
FIG. 3 is a plot of particle release from a fused silica article before and after laser melting as a function of degree of surface roughness.

The effect of $CO_2$ laser roughening on edge particle shedding is shown in FIG. 3, which is a plot of the number of particles released (expressed in particle count/10 ml deionized (DI) water) in deionized water during sonic agitation under the conditions previously described herein. To obtain the data shown in FIG. 3, peripheral surfaces were first ground to grade 2 roughness (460 nm RMS roughness) and grade 3 roughness (240 nm RMS roughness), as determined by interferometry techniques known in the art such as scanning white light or phase shift interferometry. Grades of roughnesses are listed in Table 1. These peripheral surfaces were then subjected to $CO_2$ laser roughening. Edge particle shedding—i.e., particle release—was measured before and after $CO_2$ laser roughening.

The results shown in FIG. 3 reveal that for all grades of roughness, the peripheral surfaces that had been roughened by the $CO_2$ laser exhibit reduced levels of particle release. In particular, the level of release from grade 1 and grade 2 surfaces after $CO_2$ laser roughening was at least an order of magnitude less than those observed before laser roughening. Furthermore, the particle counts observed for laser roughened peripheral surfaces for all grades are less than 200 particles/10 ml deionized water.

TABLE 1

| Edge Grade | Grinding Grit | RMS roughness (nm) |
| --- | --- | --- |
| 0 | 600 | 581 |
| 1 | Finer than grade 0 | 521 |
| 2 | Finer than grade 1 | 459 |
| 2 | Finer than grade 2 | 236 |
| 4 | Finer than grade 3 | 214 |
| polished | Much finer than grade 4 | 6.4 |

The laser melted portion has a RMS roughness that is capable of scattering light of a predetermined wavelength. The laser melted portion presents a surface having a variable height that is determined by spacing between laser scans and the spot size of the laser beam. The laser melted portion may have a peak-to-valley variation in height, which is reflected in its RMS roughness, while having a smooth surface on a smaller scale. In one embodiment, the laser melted portion has a RMS roughness of up to about 15,000 nm. In another embodiment, the laser melted portion has a RMS roughness in a range from about 100 nm up to about 15,000 nm. In yet another embodiment, the RMS roughness is in a range from about 100 nm to about 13,000 nm.

Figure 4:
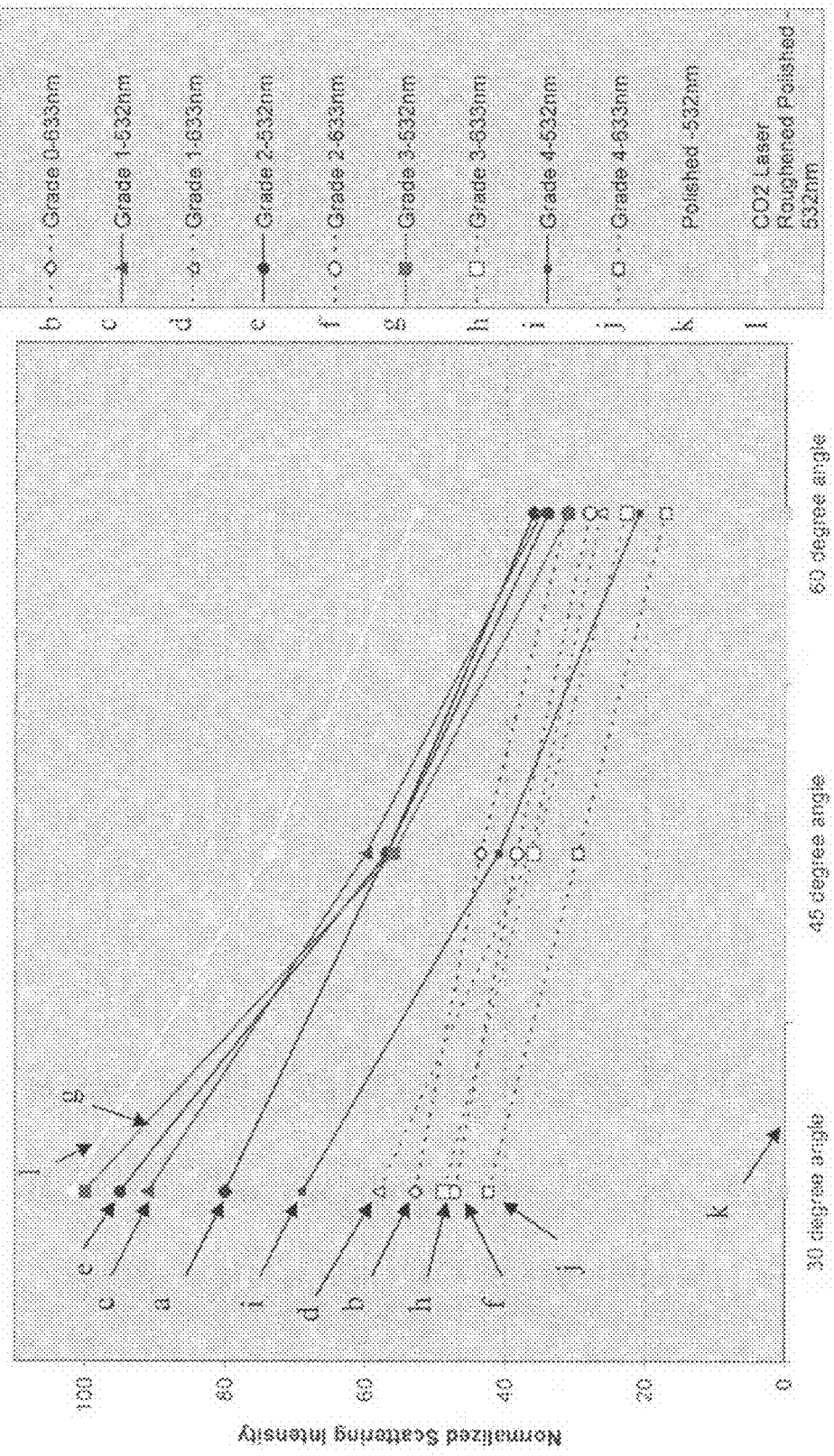
FIG. 4 is a plot of normalized scattering intensity for 532 nm and 633 nm laser light as a function of scattering angle for fused silica peripheral surfaces.

The effect of roughening by laser melting on scattering intensity of different wavelengths of laser radiation is shown in FIG. 4. Scattering intensities observed at angles of 30°, 45°, and 60° of laser radiation having wavelengths of 532 nm and 633 nm were measured for peripheral surfaces (curves a-j in FIG. 4) of fused silica articles that had been ground to the different grades of roughness listed in Table 1. Scattering intensities for 532 nm laser radiation at the above three angles were also measured for a polished peripheral surface before (curve k) and after (curve l) melting by a $CO_2$ laser. The scattering intensity observed for the peripheral surface treated with the $CO_2$ laser is greater than those observed for all of the ground surfaces and the polished surface.

In some instances, optical elements—particularly LCDIMs—are handled manually. Accordingly, it should, in one embodiment, be possible to frictionally grip the optical element on at least one peripheral surface or a portion thereof. Thus, in one embodiment, at least a portion the peripheral surface 114 has a static coefficient of friction in a range from about 0.30 to about 0.60, as measured using a Teflon™ rod in dry conditions. Thus, in one embodiment, at least a portion the peripheral surface 114 has a static coefficient of friction in a range from about 0.80 to about 0.50 as measured using a Teflon™ rod in dry conditions. The static coefficient of friction is determined as follows. Friction testing of edges (i.e., peripheral surfaces) is conducted in a cylinder-on-flat geometry using Teflon rods (5.9 mm diameter). The Teflon rods extend across the entire edge flat and beyond. A new Teflon rod is used for each test. Testing is performed using a commercial test machine that permits control and monitoring of normal and lateral loads as well as the translation velocity. The cylinders are loaded transversely onto the sample edge with the desired normal load. This normal load is maintained constant throughout the test. Sample translation is performed in a reciprocating manner at a velocity of 0.5 mm/s over a distance of 5 to 10 mm. The static coefficient of friction and kinetic (dynamic) coefficient of friction are determined using the guidelines provided in pages 1-11 of ASTM G 115-04, entitled "Standard Guide for Measuring and Reporting Friction Coefficients."

In one embodiment, the fused silica article is a LCDIM, in which case it is particularly advantageous to provide roughened peripheral surfaces or edges for articles having relatively large dimensions. One measure of the dimension of such articles is the "aspect ratio," which is the ratio of a diagonal of a planar surface of the article to the thickness of the article. Aspect ratios for planar articles of varying dimension are listed in Table 2. In one embodiment, a LCDIM having a laser melted peripheral surface as described herein has an aspect ratio of at least 100.

TABLE 2

| Length (mm) | Width (mm) | Diagonal (hypotenuse) (mm) | Thickness (mm) | Aspect ratio (mm, thick vs. diagonal) |
|---|---|---|---|---|
| 1220.0 | 1400.0 | 1857.0 | 13.0 | 142.8 |
| 800.0 | 920.0 | 1219.2 | 8.0 | 152.4 |
| 800.0 | 920.0 | 1219.2 | 10.0 | 121.9 |
| 800.0 | 960.0 | 1249.6 | 8.0 | 156.2 |
| 800.0 | 960.0 | 1249.6 | 10.0 | 125.0 |

Figure 5:
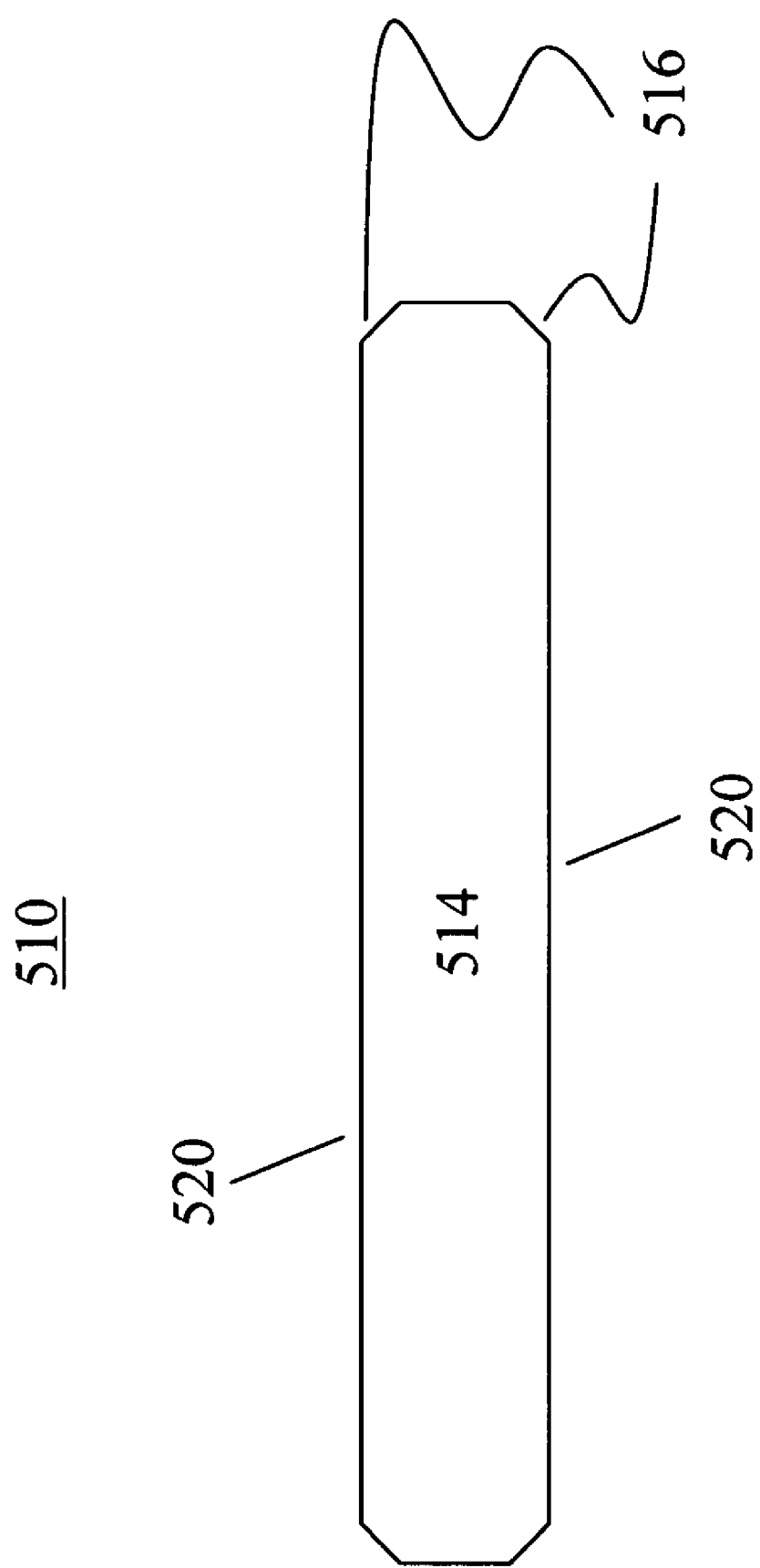
FIG. 5 is a schematic representation of a side view of a glass article having a peripheral surface comprising two chamfers.

In one embodiment, the peripheral surface further includes at least one chamfer adjacent to and intersecting a major planar surface (520 in FIG. 5) of the glass article. The chamfer is typically formed during grinding of the near net shape. A profile of a peripheral surface 514 having two chamfers 516 is schematically shown in FIG. 5. In one embodiment, at least a portion of chamfer 516 is polished, producing a transparent chamfer. In another embodiment, at least a portion of chamfer 516 has a RMS roughness that is capable of scattering light of a predetermined wavelength. The predetermined wavelength may be in a range from about 500 nm up to about 670 nm. The predetermined wavelength may, in one embodiment, be one of 532 nm and 633 nm. The RMS roughness may be produced during grinding of the near net shape to within the dimensional tolerances of the glass article by grinding chamfer 516. Chamfer 516 is relatively free of damage and generates an interface with planar faces 520 that is free of checks and chips greater than 5 μm in size.

A method of making a glass article having a roughened peripheral surface is also provided. A laser having a predetermined wavelength and a glass article that absorbs radiation at the predetermined wavelength are first provided. The glass article provided at this step may be a near net shape of the final glass article. The peripheral surface of the glass article may have been previously ground, polished, or etched, or subjected to any combination of these operations. For example, the peripheral surface may have been previously ground while grinding a near net shape to within the dimensional tolerances (i.e., to a dimension that is within a predetermined tolerance of the prescribed dimensions of the glass article) of the glass article.

Next, a portion of the peripheral surface of the glass article is irradiated with the laser. The laser causes localized melting on the surface, as previously described herein. The molten glass then resolidifies to form the roughened peripheral surface. In one embodiment, the step of irradiating a portion of peripheral surface with the laser to form the roughened peripheral surface includes rastering the laser beam across the peripheral surface to create a pattern of localized melting on the portion and resolidifying the pattern of localized melting to form the roughened peripheral surface.

In those instances where the glass article has two major faces, the method may further include polishing and cleaning the two major faces.

Similarly, a method of roughening a surface of a glass article is also provided. As previously described above, a laser having a predetermined wavelength and a glass article that absorbs radiation at the predetermined wavelength are provided. A surface of the glass article is then irradiated with the laser, causing localized melting of the glass on the surface. The molten glass then resolidifies, forming the roughened surface.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A glass article, the glass article having a peripheral surface, the peripheral surface comprising a laser melted portion, wherein the laser melted portion has a RMS roughness that is capable of scattering light of a predetermined wavelength and a particle release of less than about 650 particles/$cm^2$ area of the peripheral surface, and wherein each of the particles released is greater than 2 μm in size.

2. The glass article according to claim 1, wherein the peripheral surface has a static coefficient of friction in a range from about 0.30 to about 0.60, as measured using a Teflon rod in dry conditions.

3. The glass article according to claim 1, wherein the laser melted portion is patterned.

4. The glass article according to claim 1, wherein the glass, article is a fused silica article.

5. The glass article according to claim 4, wherein the fused silica article is a liquid crystal display image mask.

6. The glass article according to claim 4, wherein the fused silica article has an aspect ratio of at least 100.

7. The glass article according to claim 4, wherein the laser melted portion is melted by irradiation with a $CO_2$ laser.

8. The glass article according to claim 1, wherein the laser melted portion has a RMS roughness of up to about 15,000 nm.

9. The glass article according to claim 8, wherein the RMS roughness is in a range from about 100 nm up to about 15,000 nm.

10. The glass article according to claim 9, wherein the RMS roughness in a range from about 100 nm to about 13,000 nm.

11. The glass article according to claim 1, wherein the predetermined wavelength is in a range from about 500 nm to about 670 nm.

12. The glass article according to claim 1, wherein the light scattered by the roughened peripheral surface, when measured at an angle in a range from about 5° to about 60° to incident light, has a normalized intensity $I/I_O$ in a range from about 100 to 50 with absolute total scattering in a range from about 1% up to about 20%.

13. A fused silica article, the fused silica glass article having a roughened peripheral surface that is capable of scattering light of a predetermined wavelength, wherein the roughened peripheral surface comprises a laser melted portion, wherein the roughened peripheral surface has a particle release of less than about 650 particles/$cm^2$ area of the peripheral surface, wherein each of the particles released is greater than 2 μm in size.

14. The fused silica article according to claim 13, wherein the peripheral surface has a static coefficient of friction in a range from about 0.30 to about 0.60, as measured using a Teflon rod in dry conditions.

15. The fused silica article according to claim 13, wherein the laser melted portion is patterned.

16. The fused silica article according to claim 13, wherein the fused silica article is a liquid crystal display image mask.

17. The fused silica article according to claim 13, wherein the laser melted portion is melted by irradiation with a $CO_2$ laser.

18. The fused silica article according to claim 13, wherein the laser melted portion has a RMS roughness of up to about 15,000 nm.

19. The fused silica article according to claim 18, wherein the RMS roughness is in a range from about 100 nm up to about 15,000 nm.

20. The fused silica article according to claim 18, wherein the RMS roughness is in a range from about 100 nm to about 13,000 nm.

21. The fused silica article according to claim 13, wherein the predetermined wavelength is in a range from about 500 nm to about 670 inn.

22. The fused silica article according to claim 13, wherein the roughened surface scatters light that, when measured at an angle in a range from about 5° to about 60° to incident light, has a normalized intensity in a range from about 100 to 50 with absolute total scattering in a range from about 1% up to about 20%.

23. A fused silica article, the fused silica article having a roughened peripheral surface that is capable of scattering light of a predetermined wavelength, wherein the roughened peripheral surface comprises a laser melted portion, wherein the roughened peripheral surface has a particle release of less than about 650 particles/cm$^2$ area of the peripheral surface, wherein each of the particles released is greater than 2 μm in size, and wherein the roughened peripheral surface has a static coefficient of friction in a range from about 0.30 to about 0.60, as measured using a Teflon rod in dry conditions.

24. The fused silica article according to claim 23, according to claim 1, wherein the laser melted portion has a RMS roughness of up to about 15,000 nm.

25. The fused silica article according to claim 24, wherein the laser melted portion has a RMS roughness in a range from about 100 inn up to about 15,000 nm.

26. The fused silica article according to claim 24, wherein the laser melted portion has a RMS roughness in a range from about 100 nm up to about 13,000 nm.

27. The fused silica article according to claim 23, wherein the predetermined wavelength is in a range from about 500 nm to about 670 nm.

28. The fused silica article according to claim 23, wherein the roughened peripheral surface scatters light that, when measured at an angle in a range from about 5° to about 60° to incident light has a normalized intensity in a range from about 100 to 50 with absolute total scattering in a range from about 1% up to about 20%.

29. The fused silica article according to claim 23, wherein the laser melted portion is patterned.

30. The fused silica article according to claim 23, wherein the fused silica article is a liquid crystal display image mask.

31. The fused silica article according to claim 23, wherein the laser melted portion is melted by irradiation with a $CO_2$ laser.

32. A method of making a glass article having a roughened peripheral surface, the method comprising the steps of:
   a. providing a laser, the laser having a predetermined wavelength;
   b. providing a glass article having a peripheral surface, wherein the glass article absorbs radiation at the predetermined wavelength; and
   c. melting at least a portion of the peripheral surface with the laser to form the roughened peripheral surface, wherein the roughened peripheral surface has a RMS roughness that is capable of scattering light of a predetermined wavelength and a particle release of less than about 650 particles/cm$^2$ area of the peripheral surface, wherein each of the particles released is greater than 2 μm in size.

33. The method according to claim 32, wherein the step of providing a glass article having a peripheral surface comprises providing a glass article having a peripheral surface that is ground, polished, or etched.

34. The method according to claim 32, wherein the laser is a $CO_2$ laser.

35. The method according to claim 32, wherein the glass article is a fused quartz article.

36. The method according to claim 32, wherein the roughened peripheral surface scatters light of a predetermined wavelength.

37. The method according to claim 36, wherein the predetermined wavelength is in a range from about 500 nm to about 670 nm.

38. The method according to claim 36, wherein the roughened peripheral surface scatters light that, when measured at an angle in a range from about 5° to about 60° to incident light, has a normalized intensity in a range from about 100 to 50 with absolute total scattering in a range from about 1% up to about 20%.

39. The method according to claim 32, wherein at least a portion roughened peripheral surface has a RMS roughness of up to about 15,000 nm.

40. The method according to claim 32, wherein the glass article has two major faces and wherein the method further including the step of polishing the two major faces.

41. The method according to claim 32, wherein the step of irradiating at least a portion of the peripheral surface with the laser to form the roughened peripheral surface comprises rastering the laser beam across the surface to create a pattern of localized melting on the portion and resolidifying the pattern of localized melting to form the roughened peripheral surface.

42. The method according to claim 32, wherein the glass article is a liquid crystal display image mask.

43. A fused silica article, the fused silica glass article having a roughened peripheral surface that is capable of scattering light of a predetermined wavelength, wherein the roughened peripheral surface is formed by:
   a. providing a laser, the laser having a predetermined wavelength;
   b. providing the fused silica article having a peripheral surface, wherein the fused silica article absorbs radiation at the predetermined wavelength; and
   c. melting the peripheral surface with the laser to form the roughened peripheral surface, wherein the roughened peripheral surface has a particle release of less than about 650 particles/cm$^2$ area of the peripheral surface, and wherein each of the particles released is greater than 2 μm in size.

* * * * *